United States Patent [19]
Mazzei et al.

[11] Patent Number: 5,338,341
[45] Date of Patent: Aug. 16, 1994

[54] SEPARATOR FOR REMOVING GASES FROM WATER

[75] Inventors: Angelo L. Mazzei, Bakersfield; Steven D. Ford, Clovis, both of Calif.

[73] Assignee: Claude Laval Corporation, Fresno, Calif.

[21] Appl. No.: 72,781

[22] Filed: Jun. 4, 1993

[51] Int. Cl.⁵ .............................................. B01D 45/12
[52] U.S. Cl. ........................................ 96/208; 96/209; 96/210; 96/212; 96/216
[58] Field of Search ................ 96/207, 208, 209, 210, 96/212, 216, 206

[56] References Cited
U.S. PATENT DOCUMENTS

| | | | |
|---|---|---|---|
| 1,734,507 | 11/1929 | Westling et al. | 96/204 |
| 3,151,961 | 10/1964 | Blackmore et al. | 96/210 |
| 3,771,290 | 11/1973 | Stethem | 96/210 |
| 5,203,891 | 4/1993 | Lema | 96/210 |

Primary Examiner—Charles Hart
Attorney, Agent, or Firm—Donald D. Mon

[57] ABSTRACT

A separator for removing gases from water. An elongated vortex tube with an interior cylindrical wall houses a concentric separator tube of smaller diameter, leaving a vortex region between them. Perforations through the wall of the separator tube connect the interior of the separator tube to the vortex region. Water containing gas is tangentially injected into the vortex region, flowing downwardly to an exit port. Separated gases in the separator tube collect at its top and are released by a valve.

8 Claims, 1 Drawing Sheet

SEPARATOR FOR REMOVING GASES FROM WATER

FIELD OF THE INVENTION

This invention relates to the removal of gases from a stream of water.

BACKGROUND OF THE INVENTION

The presence of dissolved or entrained gases in water streams is frequently encountered, and often is acceptable. However, there are systems in which gases are injected into the stream where they can result in serious problems.

An example is in the treatment of a flowing water stream with ozone. The ozone is generally injected into the water stream at about 2% of the remainder of a gas stream from whose oxygen the ozone was generated. The remainder of the gas stream is the remaining atmospheric gases, some of whose oxygen was converted into ozone in an ozone generator. This remainder is principally nitrogen, along with lesser amounts of carbon dioxide and other atmospheric gases.

As a consequence, in order to inject relatively small amounts of ozone into the stream, significant amounts of nitrogen will also be injected, and will either be dissolved or entrained. This additional nitrogen can result in nutrification in systems such as aquaculture, and in field crops. In fact, even the elimination of atmospheric gases from an irrigating stream can result in a lessened tendency toward nitrate formation in soils.

The above circumstances identify "chemical" reasons to remove gases from a flowing water stream. There are other reasons. The injection of air into potable water systems is commonly used as a means to remove iron from the water. Later it is desirable to remove the entrained air after the treatment process has been completed.

This invention is directed to the removal of gases from a water stream. It is primarily directed toward removal of air and of its component gases.

A flowing stream of water generally includes dissolved gases and entrained gases. The term "stream" includes any kind of flow-open or within pressurized piping systems. This invention is most effective for removing entrained gases as a function of differential specific gravities. However, it is also effective for removing at least some dissolved gases as a function of a drop in pressure in the system, followed by their separation as a function of difference in specific gravities.

It is an object of this invention to provide a static separator to remove gases from a flowing stream of water.

BRIEF DESCRIPTION OF THE INVENTION

A separator according to this invention includes an elongated vortex tube having an axis and an axially extending cylindrical inner wall. Injector ports inject water under pressure into the vortex tube so that it spins downwardly to a collection chamber, tending to flow along the wall as the consequence of its centrifugal forces.

A separator tube extends axially through the vortex tube. It has an outer diameter smaller than the diameter of the inner wall of the vortex tube, and an internal passage which is open at its top. A plurality of perforations pass through the wall of the separator tube so that water and especially gases can flow into it.

The separator tube at its top end opens into a separator chamber. An air relief valve provides for release of gas from the separator chamber.

This invention will be fully understood from the following detailed description and the accompanying drawings, in which:

DETAILED DESCRIPTION OF THE INVENTION

Figure 1:
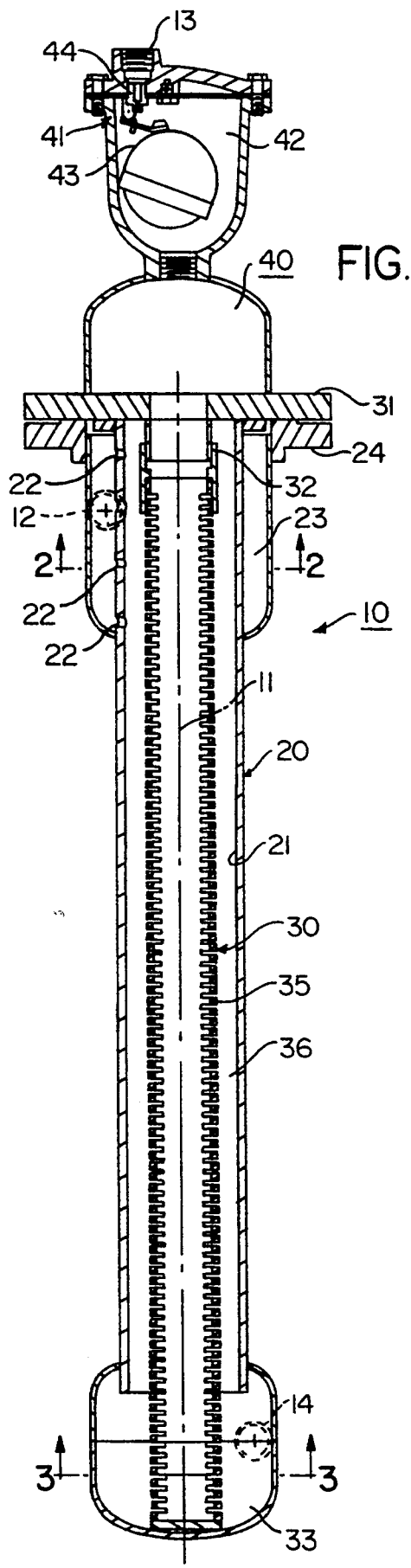
FIG. 1 is an axial cross-section of the presently-preferred embodiment of the invention.
Figure 2:
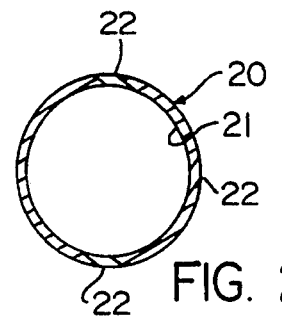
FIG. 2 is a lateral cross-section of one portion of the device, taken at line 2—2 in FIG. 1.
Figure 3:
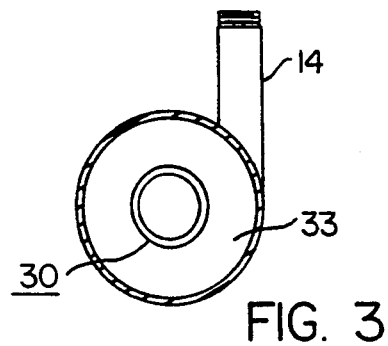
FIG. 3 is a lateral cross-section taken at line 3—3 in FIG. 1.

A separator 10 according to this invention has a central axis 11 which is maintained upright during operation. It receives a supply of water through inlet port 12. Gases which are removed from the stream are discharged through a gas exit port 13 at the top of the separator. Water from which gases have been removed are discharged through outlet port 14 at the bottom of the separator.

A vortex tube 20 extends axially. It has a cylindrical inner wall 21. Near its upper end wall it is pierced by a plurality of injector ports 22 that pass through the wall in a tangential alignment. Preferably these are disposed around the periphery of the vortex tube.

A centrifuge chamber 23 surrounds the vortex tube. It encloses ports 22, and constitutes water supply means. The inlet port supplies water under pressure to the centrifuge chamber. Conveniently the centrifuge chamber can be formed by a sleeve welded to the vortex tube and to a mounting flange 24.

Water is preferably supplied to the centrifuge chamber 23 through a supply line 25 that is tangentially directed into it. This gives the water an initial velocity as it enters injection ports 22. While it is not required that the water in chamber 23 have this initial rotational velocity, the tangential velocity imparted to it does reduce the energy loss required to force the water through ports 22. It is an advantage of this arrangement that the energy loss is minimized by this arrangement.

Water will be forced under pressure at a high velocity into the vortex tube to flow down the wall of the tube while rotating around the axis in a vortex mode. The water flows along the wall of the vortex tube because of its centrifugal forces, and downwardly as the consequence of system pressure.

A separator tube 30 extends from collector chamber 33 upwardly in the vortex tube. It is sealed to a mounting flange 31 by means of a coupling 32. When the flanges are separated, the separator tube can be removed and replaced as necessary. Outlet port 14 drains the collector chamber.

The separator tube is pierced by a plurality of perforations 35. These preferably lie in vertical rows, and are preferably formed as arcuate slots. Three sets of these perforations can conveniently be provided, each extending about 60 degrees around the tube, with 30 degree inperforate portions between them.

The outer diameter of the separator tube is smaller than the internal diameter of the vortex tube, so as to leave a vortex region 36 between them.

A separation chamber 40 communicates with the separator tube at its top. It is conveniently formed as a closed dome with an air relief valve 41 in exit port 13. The air relief valve is a conventional float-operated valve which opens to release air when the water level in the separation chamber is too low. The valve has a valving chamber 42 which is a continuation of the separation chamber, a pivoted float 43, and a float responsive valve 44.

The function of this separator is straightforward. Water under system pressure is fed to the centrifuge chamber. In turn the water is injected into the vortex tube in a tangential flow. Centrifugal forces can be the stream to bear against the internal wall of the vortex tube, and system pressure causes it to flow downwardly in the vortex region to the collection zone, from which it exits, less at least some of the gases which it brought to the separator.

In operation the separator is flooded with water. As the consequence of the difference between the specific gravities of water and the gases, entrained gases tend to move toward the axis and through the perforations. The entrained gases include those which were initially present as bubbles and those which were released from solution as the consequence of change of pressure during injection into the separator, and in the flow paths in the separator.

The contents in the separator tube are water and a surprising amount of bubbles. The water in this tube is not particularly turbulent, because in passing through the perforations, much of the rotational velocity of that water has been dissipated. The bubbles rise quickly to the separation chamber. An air-water interface (not shown) is established in the separation chamber. As the air leaves the water and rises above it, it tends to force the water level down. The air relief valve is responsive to this situation, and releases air as necessary to allow the interface to rise to a predetermined level.

The air relief valve may be physically located in the dome of the separation chamber, but is more readily serviced if it is physically attached to the dome above it. In that arrangement, the float chamber 45 of the air relief valve is part of the separation chamber. The interface will be established in it, and exit port 13 is its own outlet port.

Thus this separator is a static device which injects a water stream into a vortex pattern, and provides a relatively quiescent region in which gases can rise to be discharged from the system after having been removed from solution or entrainment by the centrifugal action of the vortex stream.

The dimensions of the system are arbitrary, and can be scaled for different throughput rates and pressures. One suitable separator, which effectively treats about 20 gallons per hour with a 50 psig input has a vortex tube about 30 inches long, and an internal diameter of about 4 inches. The separator tube is about 28 inches long, with an external diameter of about $2\frac{1}{4}$ inches and an internal diameter of about 2 inches. The perforations may be horizontal slits about 3/16 inches wide spaced axially apart by about $\frac{3}{8}$ inch, disposed in three axially extending rows. Minor experimentation with dimensions will produce optimal relationships for other systems.

This invention is not to be limited by the embodiment shown in the drawings and described in the description, which is given by way of example and not of limitation, but only in accordance with the scope of the appended claims.

We claim:

1. A separator for removing gases from a flowing water stream comprising:

a vortex tube having a central axis, an axially extending cylindrical wall, and a plurality of injector ports passing tangentially through said wall;

water supply means communicating with said injector ports, said water supply means delivering water from which gases are to be removed;

a collection chamber connected to said vortex tube, spaced from and below the level of said injector ports;

a separator tube having an internal cylindrical wall, an external cylindrical wall, and a plurality of separator perforations extending between said walls, the diameter of the external cylindrical wall of the separator tube being smaller than the internal diameter of the vortex tube so as to leave an annularly shaped axially extending vortex region between them, vortex region extending from the perforations to the collection chamber;

a separation chamber connected to said separator tube above the injector ports; and a gas relief valve controlling exit of gases from said separation chamber.

2. A separator according to claim 1 in which said water supply means comprises a centrifuge chamber peripherally extending around the vortex tube and enclosing said injector ports.

3. A separator according to claim 2 in which said water supply means enters said centrifuge chamber in a tangential orientation to provide a centrifugal movement to the water before it enters said injector ports.

4. A separator according to claim 3 in which said perforations are spaced apart along the length of the separator tube.

5. A separator according to claim 4 in which said perforations are arcuate slots which lie in planes normal to the axis of the vortex tube.

6. A separator according to claim 1 in which the gas relief valve is disposed in the separation chamber and acts to maintain a predetermined water level therein.

7. A separator according to claim 6 in which said perforations are spaced apart along the length of the separator tube.

8. A separator according to claim 7 in which said perforations are arcuate slots which lie in planes normal to the axis of the vortex tube.

* * * * *